(12) United States Patent
O'Brien et al.

(10) Patent No.: US 10,260,632 B2
(45) Date of Patent: Apr. 16, 2019

(54) CHAMBER SEAL FOR MASS SPECTROMETER

(71) Applicant: Micromass UK Limited, Wilmslow (GB)

(72) Inventors: Stephen O'Brien, Manchester (GB); Ian Trivett, Cheadle (GB)

(73) Assignee: MICROMASS UK LIMITED, Wilmslow (GB)

( * ) Notice: Subject to any disclaimer, the term of this patent is extended or adjusted under 35 U.S.C. 154(b) by 0 days.

(21) Appl. No.: 15/023,053

(22) PCT Filed: Sep. 17, 2014

(86) PCT No.: PCT/GB2014/052824
§ 371 (c)(1),
(2) Date: Mar. 18, 2016

(87) PCT Pub. No.: WO2015/040390
PCT Pub. Date: Mar. 26, 2015

(65) Prior Publication Data
US 2016/0230889 A1 Aug. 11, 2016

(30) Foreign Application Priority Data

Sep. 20, 2013 (EP) .................................... 13185299
Sep. 20, 2013 (GB) .................................... 1316695.4

(51) Int. Cl.
*F16J 15/02* (2006.01)
*H01J 49/24* (2006.01)
*H01J 49/26* (2006.01)

(52) U.S. Cl.
CPC ............. *F16J 15/025* (2013.01); *H01J 49/24* (2013.01); *H01J 49/26* (2013.01)

(58) Field of Classification Search
CPC ..... F16K 31/0627; F16K 41/08; F16J 15/025; H01J 49/24; H01J 49/26
See application file for complete search history.

(56) References Cited

U.S. PATENT DOCUMENTS

| 4,985,625 A | 1/1991 | Hurst |
| 5,753,910 A * | 5/1998 | Gourley ............... H01J 49/145 250/281 |

(Continued)

FOREIGN PATENT DOCUMENTS

| DE | 9400067 | 3/1994 |
| DE | 20205467 | 8/2002 |

(Continued)

OTHER PUBLICATIONS

Office Action issued by the European Patent Office relating to EP Application No. 14 772 426.4, dated Jul. 14, 2017.

*Primary Examiner* — Wyatt A Stoffa
(74) *Attorney, Agent, or Firm* — Womble Bond Dickinson (US) LLP; Deborah M. Vernon; Heath T. Misley

(57) ABSTRACT

A mass spectrometer is disclosed comprising a first component, an annular vacuum chamber seal and a second component. The first component has a groove. The annular vacuum chamber seal comprises a main body portion and one or more blade or rib portions which protrude from the main body portion. The main body portion is located in the groove and the one or more blade or rib portions protrude above or beyond a surface of the first component. The second component is slid, in use, along the surface of the first component thereby deforming the one or more blade or rib portions so that the one or more blade or rib portions form a radial, diametric or piston seal between the first and second components.

17 Claims, 4 Drawing Sheets

(56) References Cited

U.S. PATENT DOCUMENTS

| | | | |
|---|---|---|---|
| 6,494,466 B1 | 12/2002 | Hartman et al. | |
| 6,523,833 B1* | 2/2003 | Ishigaki | F16J 15/025 |
| | | | 277/549 |
| 6,759,650 B2* | 7/2004 | Covey | H01J 49/049 |
| | | | 250/282 |
| 6,809,312 B1* | 10/2004 | Park | H01J 49/24 |
| | | | 250/281 |
| 7,559,557 B2* | 7/2009 | Thronson | H01J 37/16 |
| | | | 250/492.21 |
| 7,863,561 B2* | 1/2011 | Jarrell | G01N 30/7266 |
| | | | 250/281 |
| 7,954,823 B2 | 6/2011 | Horie et al. | |
| 8,128,396 B2* | 3/2012 | Ross | F16J 15/061 |
| | | | 156/286 |
| 8,536,522 B2* | 9/2013 | Howes | H01J 49/10 |
| | | | 250/282 |
| 2007/0210533 A1* | 9/2007 | Okabe | F16J 15/002 |
| | | | 277/628 |
| 2009/0134324 A1* | 5/2009 | King | H01J 49/24 |
| | | | 250/282 |
| 2009/0173905 A1* | 7/2009 | Boesch | F16K 1/36 |
| | | | 251/359 |
| 2009/0206558 A1* | 8/2009 | Nameki | F16J 15/062 |
| | | | 277/644 |
| 2010/0219336 A1* | 9/2010 | Hofstadler | G01R 31/2812 |
| | | | 250/282 |
| 2011/0227292 A1* | 9/2011 | Takano | F16J 15/3204 |
| | | | 277/549 |
| 2012/0267864 A1 | 10/2012 | Watanabe et al. | |

FOREIGN PATENT DOCUMENTS

| | | |
|---|---|---|
| DE | 102007056292 | 5/2009 |
| EP | 1988312 A1 | 11/2008 |
| EP | 2351953 A1 | 8/2011 |
| GB | 1280522 | 7/1972 |
| JP | 11336908 | 12/1999 |
| WO | 01/51841 | 7/2001 |
| WO | 2008/114484 | 9/2008 |

* cited by examiner

CHAMBER SEAL FOR MASS SPECTROMETER

CROSS REFERENCE TO RELATED APPLICATIONS

This application is the National Stage of International Application No. PCT/GB2014/052824, filed 17 Sep. 2014 which claims priority from and the benefit of United Kingdom patent application No. 1316695.4 filed on 20 Sep. 2013 and European patent application No. 13185299.8 filed on 20 Sep. 2013. The entire contents of these applications are incorporated herein by reference.

BACKGROUND OF THE PRESENT INVENTION

The present invention relates to a mass spectrometer and a method of assembling a mass spectrometer.

It is known to use an O-ring seal to provide a gas or vacuum seal between two vacuum chambers or differential pumping regions of a mass spectrometer. The O-ring seals are conventionally manufactured from VITON® or another similar elastomer material. O-ring seals are readily available, come in a range of sizes/dimensions and are relatively inexpensive. However, in certain applications the circular cross sectional profile of the known O-ring seal is not ideal.

In conventional mass spectrometers O-ring seals which are located between two vacuum chambers are compressed under a mechanical load which is provided by, for example, screw fixings. The conventional O-ring seals deform under compression in order to provide a gas/vacuum seal.

One particular problem with conventional O-ring seals is that they require tight tolerance control and it can be hard for a user to insert and remove an O-ring seal from its intended position. This is particularly problematic if the O-ring seals are provided in section of a mass spectrometer which requires regular disassembly in order to service and maintain the mass spectrometer.

In particular, a substantial force is commonly required in order to insert and remove conventional O-ring seals from their sealing location. The force required is often beyond user comfort levels.

US2010/0301207 (Micromass) discloses an improved seal between a mass spectrometer and a hinged ion source. A seal having a substantially rectangular base and an arcuate domed exposed portion is mounted in a groove on the ion source enclosure. The arcuate domed exposed portion protrudes from the groove in an axial direction (i.e. in a direction perpendicular to the plane in which the seal lies), such that when the ion source is closed, the seal is axially compressed against the seal face of the mass spectrometer.

Although the seal disclosed in US2010/0301207 is advantageous in its own right, the Applicants believe that there remains scope for improvements to annular vacuum chamber seals for mass spectrometers.

It is desired to provide an improved mass spectrometer.

SUMMARY OF THE PRESENT INVENTION

According to an aspect of the present invention, there is provided a mass spectrometer comprising:

a first component having a groove;

an annular vacuum chamber seal comprising a main body portion and one or more blade or rib portions which protrude from the main body portion, wherein the main body portion is located in the groove and wherein the one or more blade or rib portions protrude above or beyond a surface of the first component;

a second component arranged and adapted to be slid along the surface of the first component and to thereby deform the one or more blade or rib portions so that the one or more blade or rib portions form a radial, diametric or piston seal between the first and second components.

The preferred embodiment of the present invention relates to a mass spectrometer having a first component and a second component which are sealed by an annular vacuum chamber seal. The annular vacuum chamber seal comprises a main body portion and one or more blade or rib portions. The main body portion is located in a groove of the first component, and the one or more blade or rib portions protrude above or beyond a surface of the first component. The second component is arranged and adapted to be slid along the surface of the first component and to thereby deform the one or more blade or rib portions so that the one or more blade or rib portions form a radial, diametric or piston seal between the first and second components.

Thus, in the preferred embodiment of the present invention, the annular vacuum chamber seal is arranged to form a radial, diametric or piston seal between the first and second components of the mass spectrometer.

The annular seal of the preferred embodiment is easy to insert and remove and the pressure/compression required to insert and remove the seal is preferably substantially lower than the force required to insert or remove a conventional O-ring seal from its sealing or seating location. Furthermore, the seal of the preferred embodiment requires much less mechanical compression than a conventional O-ring seal in order to form a gas/vacuum tight sealing arrangement.

Conventional O-ring seals require that the surface with which the O-ring seals is finished to a high degree and is substantially free of scratches and other imperfections. In contrast, the annular seal of the preferred embodiment is substantially more tolerant to surface finish variations and imperfections. In particular, the seal of the preferred embodiment will still form a gas or vacuum tight seal if the sealing surface is scratched or substantially unpolished. The seal of the preferred embodiment therefore places lower tolerances and requirements upon the manufacturing process and as a result reduces the manufacturing cost as compared with using conventional O-ring seals.

It will furthermore be appreciated that the annular vacuum chamber seal of the present invention is distinct from and represents an improvement over the seal disclosed in US2010/0301207. As discussed above, in US2010/0301207, the arcuate domed exposed portion protrudes from the groove in an axial direction (i.e. in a direction perpendicular to the plane in which the annular seal lies). In contrast, the annular vacuum chamber seal of the preferred embodiment is arranged to form a radial, diametric or piston seal between the first and second components of the mass spectrometer.

In a particularly preferred embodiment the one or more blade or rib portions of the seal protrude from the main body portion of the seal in a radial direction (i.e. in a direction parallel to the plane in which the annular seal lies), and the one or more blade or rib portions is preferably asymmetrically deformed, preferably in the (axial) direction orthogonal to the (radial) direction in which the one or more blade or rib portions protrudes by the second component.

The annular seal of the preferred embodiment requires less mechanical compression than the seal of US2010/0301207 in order to form a gas/vacuum tight sealing arrangement and is substantially more tolerant to surface finish variations and imperfections.

Moreover, the annular seal of the preferred embodiment is arranged such that it may advantageously be used to locate the second component relative to the first component as the second component is slid along the surface of the first component. The seal of the preferred embodiment can advantageously form a seal with non-round or miss-aligned parts.

Another advantage of the preferred embodiment is that the one or more blade or rib portions are preferably arranged and adapted to deform into free space by the second component (as opposed to into the main body portion). This advantageously means that the seal can be made to be relatively thin when compared with prior art seals.

It will therefore be appreciated that the present invention provides an improved mass spectrometer.

In an embodiment:
the groove comprises an annular groove;
the main body portion comprises an annular main body portion; and/or
the one or more blade or rib portions comprises one or more annular blade or rib portions.

In an embodiment:
the one or more blade or rib portions protrude from the main body portion such that the one or more blade or rib portions substantially surrounds the main body portion and/or the groove; or
the one or more blade or rib portions protrude from the main body portion such that the main body portion and/or the groove substantially surrounds the one or more blade or rib portions.

In an embodiment, the one or more blade or rib portions protrude from the main body portion such that the one or more blade or rib portions is substantially concentric and/or coaxial with the main body portion and/or the groove.

In an embodiment, the annular vacuum chamber seal is substantially arranged in a first plane, and wherein:
the one or more blade or rib portions protrude from the main body portion in a direction parallel to the first plane; and/or
the one or more blade or rib portions protrude above or beyond the surface of the first component in a direction parallel to the first plane.

In an embodiment:
the second component is arranged and adapted to substantially surround the surface of the first component when the second component is slid along the surface of the first component; or
the surface of the first component is arranged and adapted to substantially surround the second component when the second component is slid along the surface of the first component.

In an embodiment, the surface of the first component comprises a first cylindrical surface.

In an embodiment, the second component comprises a second cylindrical surface which is arranged and adapted to be slid along the first cylindrical surface of the first component and to thereby deform the one or more blade or rib portions so that the one or more blade or rib portions form a radial, diametric or piston seal between the first and second components.

In an embodiment, the second cylindrical surface is arranged and adapted to be substantially coaxial with the first cylindrical surface of the first component when the second component is slid along the surface of the first component.

In an embodiment, the one or more blade or rib portions is arranged and adapted to be asymmetrically deformed by the second component.

In an embodiment, the annular vacuum chamber seal is substantially arranged in a first plane, and wherein the one or more blade or rib portions is arranged and adapted to be deformed in a direction perpendicular to the first plane by the second component.

In an embodiment, the main body portion has a maximum diameter $d_1$ and the one or more blade or rib portions have a maximum diameter $d_2$, wherein $d_2 < d_1$.

In an embodiment, the one or more blade or rib portions have an outer profile which has one or more points of inflexion.

In an embodiment, the main body portion has a cross-sectional area $A_1$ and the one or more blade or rib portions have a cross-sectional area $A_2$, wherein $A_2 < A_1$.

In an embodiment, the one or more blade or rib portions comprise a reduced thickness portion which facilitates compression and/or distortion of the one or more blade or rib portions.

In an embodiment, the annular vacuum chamber seal is arranged and adapted to provide a vacuum seal between two vacuum chambers or differential pumping regions of the mass spectrometer.

In an embodiment, the annular vacuum chamber seal is arranged and adapted to provide a vacuum seal between a vacuum chamber or a sub-atmospheric pressure region of the mass spectrometer and an atmospheric pressure region.

In an embodiment, the main body portion has a substantially rectangular, square or polygonal cross-sectional profile.

In an embodiment, the one or more blade or rib portions are arranged and adapted to deform in use as the second component of the mass spectrometer is mounted upon or mated with the first component of a mass spectrometer.

In an embodiment, the one or more blade or rib portions are arranged and adapted to deform, in use, and to be compressed towards and against the main body portion.

In an embodiment, the annular vacuum chamber seal is located between the first component and the second component.

In an embodiment, the first component comprises a first mating surface and the second component comprises a second mating surface, wherein the annular vacuum chamber seal is arranged and adapted to provide a gas tight seal and/or vacuum seal between the first mating surface and the second mating surface.

In an embodiment, the annular vacuum chamber seal is arranged and adapted to provide a gas tight seal and/or vacuum seal between the first mating surface and the second mating surface whilst under compression.

In an embodiment, the first component comprises an ion block or a first vacuum chamber and the second component comprises a pumping block, a main housing of the mass spectrometer or a second vacuum chamber.

In an embodiment, the mass spectrometer comprises a miniature mass spectrometer.

According to an aspect of the present invention, there is provided a method of assembling a mass spectrometer comprising:
providing a first component having a groove;
locating an annular vacuum chamber seal comprising a main body portion and one or more blade or rib portions which protrude from the main body portion in the groove such that the one or more blade or rib portions protrude above or beyond a surface of the first component; and sliding a second component along the surface of the first component thereby deforming the one or more blade or rib portions so that the one or more blade or rib portions form a radial, diametric or piston seal between the first and second components.

According to an aspect of the present invention there is provided an annular seal for a mass spectrometer, wherein the seal comprises a main body portion and one or more blade or rib portions which protrude from the main body portion.

The main body portion preferably has a maximum diameter d1 and the one or more blade or rib portions preferably have a maximum diameter d2, wherein d2<d1.

The one or more blade or rib portions preferably have an outer profile which has one or more points of inflexion.

The main body portion preferably has a cross-sectional area A1 and the one or more blade or rib portions preferably have a cross-sectional area A2, wherein A2<A1.

The one or more blade or rib portions preferably comprise a reduced thickness portion which facilitates compression and/or distortion of the one or more blade or rib portions.

The annular vacuum chamber seal is preferably arranged and adapted to provide a vacuum seal between two vacuum chambers or differential pumping regions of a mass spectrometer.

The annular vacuum chamber seal may alternatively be arranged and adapted to provide a vacuum seal between a vacuum chamber or a sub-atmospheric pressure region of a mass spectrometer and an atmospheric pressure region.

The main body portion preferably has a substantially rectangular, square or polygonal cross-sectional profile.

The main body portion is preferably arranged and adapted to be secured in a groove of a first component of a mass spectrometer.

The one or more blade or rib portions are preferably arranged and adapted to extend or protrude above or beyond a surface of the first component.

The one or more blade or rib portions are preferably arranged and adapted to deform in use as a second component of a mass spectrometer is mounted upon or mated with the first component of a mass spectrometer.

The one or more blade or rib portions are preferably arranged and adapted to deform, in use, and to be compressed towards and against the main body portion.

According to another aspect of the present invention there is provided a mass spectrometer comprising one or more annular vacuum seals as described above.

The mass spectrometer preferably comprises:
a first component; and
a second component;
wherein the one or more annular vacuum chamber seals are located between the first component and the second component.

The first component preferably comprises a first mating surface and the second component preferably comprises a second mating surface, wherein the one or more annular vacuum chamber seals are arranged and adapted to provide a gas tight seal and/or vacuum seal between the first mating surface and the second mating surface.

The one or more annular vacuum chamber seals are preferably arranged and adapted to provide a gas tight seal and/or vacuum seal between the first mating surface and the second mating surface whilst under compression.

The first component may comprise an ion block or a first vacuum chamber and the second component may comprise a pumping block, a main housing of the mass spectrometer or a second vacuum chamber.

The mass spectrometer preferably comprises a miniature mass spectrometer.

According to another aspect of the present invention there is provided a method of assembling a mass spectrometer comprising:
providing a first component;
providing a second component; and
locating one or more annular vacuum chamber seals as described above between the first component and the second component.

According to another aspect of the present invention there is provided a mass spectrometer comprising:
a first housing having a groove;
a second housing; and
an annular vacuum chamber seal located in the groove and comprising a main body portion and one or more blade or rib portions which protrude from the main body portion, wherein the one or more blade or rib portions are compressed and/or deformed when the second housing is mounted to the first housing.

According to another aspect of the present invention there is provided a method of assembling a mass spectrometer comprising:
providing a first housing having a groove;
providing a second housing;
locating an annular vacuum chamber seal in the groove, wherein the annular vacuum chamber seal comprises a main body portion and one or more blade or rib portions which protrude from the main body portion; and
compressing and/or deforming the one or more blade or rib portions when mounting the second housing to the first housing.

A particularly preferred aspect of the preferred embodiment is that the preferred seal has a profile wherein the main body portion has a relatively thick profile and wherein a relatively thinner deformable blade is provided which forms a sealing face. The profile of the seal ensures that the flanges of a mass spectrometer which form a vacuum seal with the preferred seal play a key role in the control of a concentric region for the seal to locate within.

According to a preferred embodiment there is provided a seal which provides a vacuum/air tight seal across one or more vacuum chambers or differential pumping regions of a mass spectrometer or between an atmospheric pressure region and a vacuum chamber or sub-atmospheric pressure region of a mass spectrometer.

The preferred seal is preferably easy to insert and remove and the pressure/compression required to insert and remove the preferred seal is preferably substantially lower than the force required to insert or remove a conventional O-ring seal from its sealing or seating location.

A further advantage of the preferred seal is that the preferred seal is substantially easier to slide into position or to glide along a flange or other surface into position compared with a conventional O-ring seal.

The preferred seal preferably has a wiper seal profile. The preferred seal is preferably stretch fitted to a carrier or mating surface of a vacuum chamber which may according to a preferred embodiment comprises a groove having a substantially circular profile. The seal according to the preferred embodiment preferably fits internally within an internal receiving diameter of the groove and the groove preferably has the same profile but is dimensioned so as to be slightly larger in order to accommodate the main body portion of the seal. If the preferred seal were absent then there would be a clearance gap between the two mating parts and a leak would be inevitable as it would not be possible to hold these two regions at different pressures or stop the flow of gas across this interface.

The profile of the preferred seal preferably fills the clearance gap and provides a vacuum tight or gas tight sealing arrangement.

The seal according to the preferred embodiment is preferably easily installed and easily removed from the interfacing parts. The preferred seal requires much less mechanical compression than a conventional O-ring seal in order to form a gas/vacuum tight sealing arrangement.

An important distinction between a conventional O-ring seal and a seal according to the preferred embodiment is that the known O-ring seal has a circular cross-sectional profile (i.e. the diameter is the same in all directions across the cross sectional profile) whereas the preferred seal has a non-circular cross-sectional profile.

Conventional O-ring seals are very dependent on the interference gap being very consistent for the full diameter such that the compression of the seal is equal for the full diameter. Due to the round or circular form of the O-ring, the sealing face is a small tangent of the total diameter. Greater sealing face can be obtained by greater compression of the seal. However, in practice the loads required to form a vacuum seal having a large sealing face using a conventional O-ring seal can be very high depending upon the cross section of the seal and the hardness of the rubber. In particular, the force required to secure an O-ring seal in position can be greater than a user can comfortably provide.

Furthermore, conventional O-ring seals require that the surface with which the O-ring seals is finished to a high degree and is substantially free of scratches and other imperfections. In contrast, the preferred seal is substantially more tolerant to surface finish variations and imperfections. In particular, the preferred seal will still form a gas or vacuum tight seal if the sealing surface is scratched or substantially unpolished. The preferred seal therefore places lower tolerances and requirements upon the manufacturing process and as a result reduces the manufacturing cost as compared with using conventional O-ring seals.

High loads can be applied to circular seals using flanges and with the aid of clamping e.g. mechanical fasteners. However, greater compression is more difficult with diametric sealing (i.e. piston sealing) which is used conventionally to form a vacuum chamber seal.

High loads can be achieved by reducing the clearance for the O-ring. However, this then makes it more difficult to insert the O-ring into position and subsequently to remove the O-ring.

According to an embodiment the mass spectrometer may further comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; and (xxviii) a Laser Ablation Electrospray Ionisation ("LAESI") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or (k) a device or ion gate for pulsing ions; and/or (l) a device for converting a substantially continuous ion beam into a pulsed ion beam.

The mass spectrometer may further comprise either:

(i) a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an embodiment the mass spectrometer further comprises a device arranged and adapted to supply an AC or RF voltage to the electrodes. The AC or RF voltage preferably has an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak.

The AC or RF voltage preferably has a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

The mass spectrometer may also comprise a chromatography or other separation device upstream of an ion source. According to an embodiment the chromatography separation device comprises a liquid chromatography or gas chromatography device. According to another embodiment the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The mass spectrometer may comprise a chromatography detector.

The chromatography detector may comprise a destructive chromatography detector preferably selected from the group consisting of: (i) a Flame Ionization Detector ("FID"); (ii) an aerosol-based detector or Nano Quantity Analyte Detector ("NQAD"); (iii) a Flame Photometric Detector ("FPD"); (iv) an Atomic-Emission Detector ("AED"); (v) a Nitrogen Phosphorus Detector ("NPD"); and (vi) an Evaporative Light Scattering Detector ("ELSD").

Additionally or alternatively, the chromatography detector may comprise a non-destructive chromatography detector preferably selected from the group consisting of: (i) a fixed or variable wavelength UV detector; (ii) a Thermal Conductivity Detector ("TCD"); (iii) a fluorescence detector; (iv) an Electron Capture Detector ("ECD"); (v) a conductivity monitor; (vi) a Photoionization Detector ("PID"); (vii) a Refractive Index Detector ("RID"); (viii) a radio flow detector; and (ix) a chiral detector.

The ion guide is preferably maintained at a pressure selected from the group consisting of: (i) <0.0001 mbar; (ii) 0.0001-0.001 mbar; (iii) 0.001-0.01 mbar; (iv) 0.01-0.1 mbar; (v) 0.1-1 mbar; (vi) 1-10 mbar; (vii) 10-100 mbar; (viii) 100-1000 mbar; and (ix) >1000 mbar.

According to an embodiment analyte ions may be subjected to Electron Transfer Dissociation ("ETD") fragmentation in an Electron Transfer Dissociation fragmentation device. Analyte ions are preferably caused to interact with ETD reagent ions within an ion guide or fragmentation device.

According to an embodiment in order to effect Electron Transfer Dissociation either: (a) analyte ions are fragmented or are induced to dissociate and form product or fragment ions upon interacting with reagent ions; and/or (b) electrons are transferred from one or more reagent anions or negatively charged ions to one or more multiply charged analyte cations or positively charged ions whereupon at least some of the multiply charged analyte cations or positively charged ions are induced to dissociate and form product or fragment ions; and/or (c) analyte ions are fragmented or are induced to dissociate and form product or fragment ions upon interacting with neutral reagent gas molecules or atoms or a non-ionic reagent gas; and/or (d) electrons are transferred from one or more neutral, non-ionic or uncharged basic gases or vapours to one or more multiply charged analyte cations or positively charged ions whereupon at least some of the multiply charged analyte cations or positively charged ions are induced to dissociate and form product or fragment ions; and/or (e) electrons are transferred from one or more neutral, non-ionic or uncharged superbase reagent gases or vapours to one or more multiply charged analyte cations or positively charged ions whereupon at least some of the multiply charge analyte cations or positively charged ions are induced to dissociate and form product or fragment ions; and/or (f) electrons are transferred from one or more neutral, non-ionic or uncharged alkali metal gases or vapours to one or more multiply charged analyte cations or positively charged ions whereupon at least some of the multiply charged analyte cations or positively charged ions are induced to dissociate and form product or fragment ions; and/or (g) electrons are transferred from one or more neutral, non-ionic or uncharged gases, vapours or atoms to one or more multiply charged analyte cations or positively charged ions whereupon at least some of the multiply charged analyte cations or positively charged ions are induced to dissociate and form product or fragment ions, wherein the one or more neutral, non-ionic or uncharged gases, vapours or atoms are selected from the group consisting of: (i) sodium vapour or atoms; (ii) lithium vapour or atoms; (iii) potassium vapour or atoms; (iv) rubidium vapour or atoms; (v) caesium vapour or atoms; (vi) francium vapour or atoms; (vii) $C_{60}$ vapour or atoms; and (viii) magnesium vapour or atoms.

The multiply charged analyte cations or positively charged ions preferably comprise peptides, polypeptides, proteins or biomolecules.

According to an embodiment in order to effect Electron Transfer Dissociation: (a) the reagent anions or negatively charged ions are derived from a polyaromatic hydrocarbon or a substituted polyaromatic hydrocarbon; and/or (b) the reagent anions or negatively charged ions are derived from the group consisting of: (i) anthracene; (ii) 9,10 diphenyl-anthracene; (iii) naphthalene; (iv) fluorine; (v) phenanthrene; (vi) pyrene; (vii) fluoranthene; (viii) chrysene; (ix) triphenylene; (x) perylene; (xi) acridine; (xii) 2,2' dipyridyl; (xiii) 2,2' biquinoline; (xiv) 9-anthracenecarbonitrile; (xv) dibenzothiophene; (xvi) 1,10'-phenanthroline; (xvii) 9' anthracenecarbonitrile; and (xviii) anthraquinone; and/or (c) the reagent ions or negatively charged ions comprise azobenzene anions or azobenzene radical anions.

According to a particularly preferred embodiment the process of Electron Transfer Dissociation fragmentation comprises interacting analyte ions with reagent ions, wherein the reagent ions comprise dicyanobenzene, 4-nitro-toluene or azulene.

BRIEF DESCRIPTION OF THE DRAWINGS

Various embodiments of the present invention together with other arrangements given for illustrative purposes only will now be described, by way of example only, and with reference to the accompanying drawings in which.

DETAILED DESCRIPTION OF PREFERRED EMBODIMENTS

A preferred embodiment of the present invention will now be described with reference to FIG. 1.

According to a preferred embodiment of the present invention a mass spectrometer comprising a chamber seal 1 is provided. The chamber seal 1 has a seal profile which is preferably manufactured to the required size and form using transfer compression moulding. According to other embodiments of the present invention other forms of moulding may also be used.

The preferred seal form is preferably cut into a mould cavity into which liquid rubber is preferably filled. Once cured the cavity is preferably opened producing a solid form derived from the cavity form.

The form of the preferred seal 1 preferably corresponds with the geometry of a portion of a housing of a vacuum chamber of a mass spectrometer.

Figure 1:
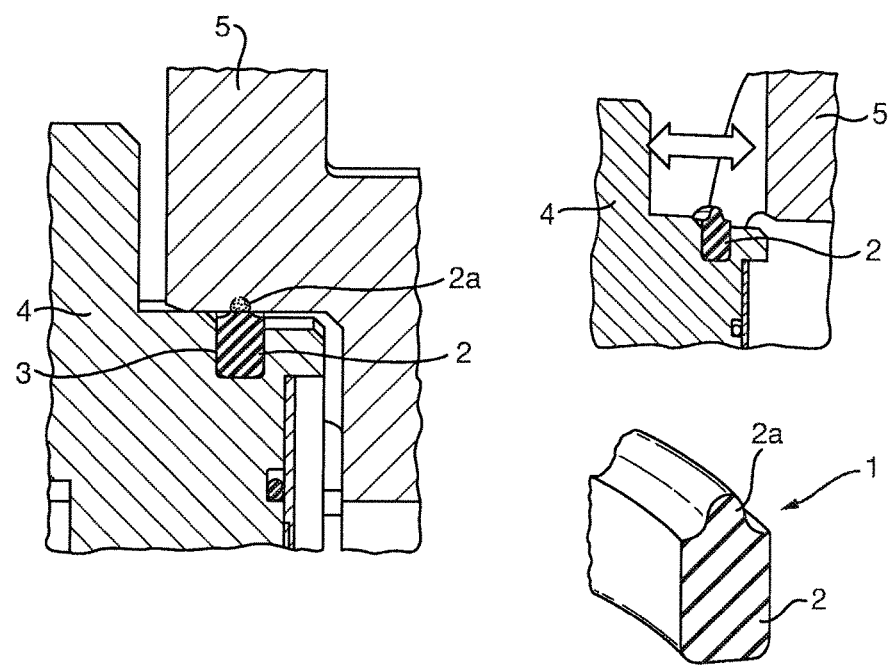
FIG. 1 shows a seal according to a preferred embodiment.

The preferred chamber seal 1 preferably comprises a main body portion 2 having a substantially deep rectangular form as shown in FIG. 1 together with a blade or rib portion 2a which protrudes or extends from the main body portion 2.

The chamber seal 1 is preferably located within a groove 3 so as to form a radial seal. The groove 3 preferably also supports the seal 1 and holds the seal 1 in a desired position and orientation.

The groove 3 also preferably supports the seal 1 during assembly wherein the inner supporting geometry 4 is preferably located within an outer flange 5. The assembly of these two parts 4, 5 represents the interface between two chambers or separate pressure regions of a mass spectrometer.

As the two flanges 4, 5 are assembled, the seal form preferably deforms such that volume interference occurs. The portion of the seal 2a which preferably deforms is indicated by a shaded region in FIG. 1. The seal 1 comprises a thinner region or rib 2a which preferably deforms relatively easier. As the thinner region or rib 2a is compressed, it is compressed into the rubber mass volume or main body portion 2 of the seal which is preferably located within the main groove 3.

The thinner form or rib 2a at the seal region allows the seal 2a to fill and/or deform into a void that may not be fully/accurately concentric. This is a distinct advantage over a conventional O-ring seal. The inner diameter of the preferred chamber seal 1 preferably follows the form diameter of the sitting groove 3 which can be independent of the outer ring flange 5.

The flange 5 geometry about the seal 1 preferably provides some radial location/guidance but the seal blade profile 2a will preferably deform past the inner diameter of the outer flange 5 thereby providing a gas tight seal. The preferred seal 1 is preferably tolerant of a small amount of axial twist in contrast to a conventional O-ring seal.

Figure 2A:
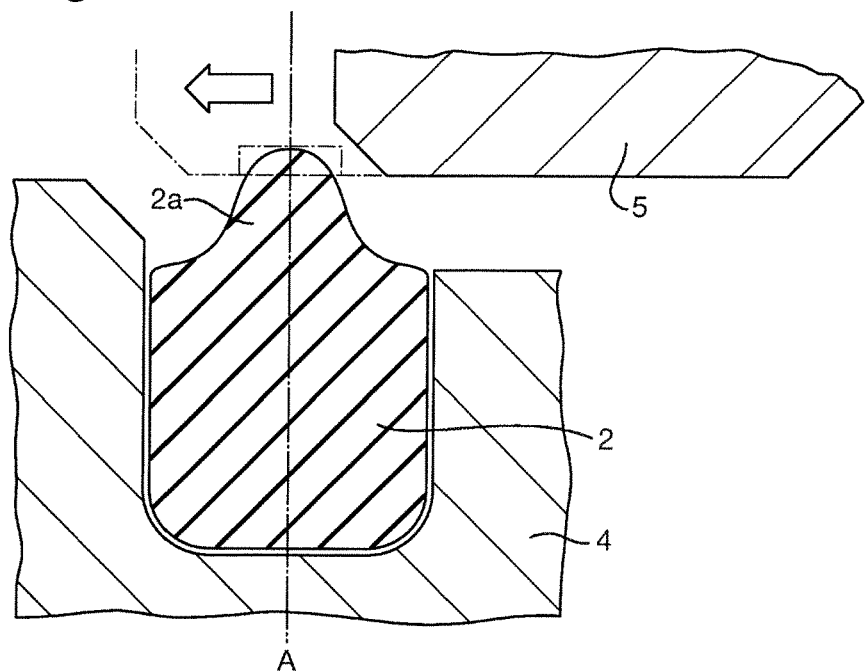
FIG. 2 shows a seal according to a preferred embodiment.
Figure 2B:
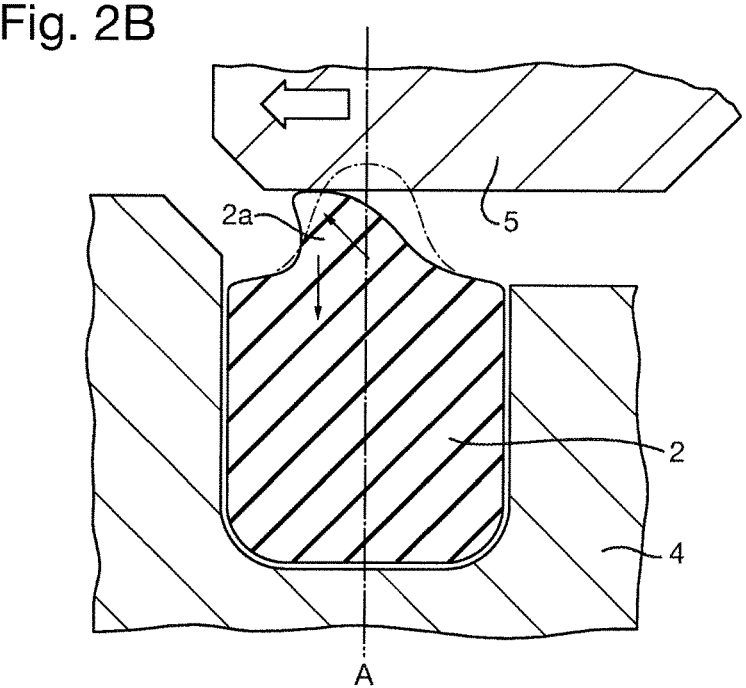

FIGS. 2A and 2B show in more detail the manner in which the seal 1 of the preferred embodiment is deformed when the two flanges 4, 5 are assembled.

As shown in FIG. 2A, the flanges 4, 5 are preferably assembled by sliding the outer surface of flange 5 along the outer surface of flange 4, i.e. in the direction of the arrow. The second component may be arranged and adapted to be slid along the surface of the first component while contacting or without contacting the surface thereby deforming the one or more blade or rib portions so that the one or more blade or rib portions form a radial, diametric or piston seal between the first and second components, i.e. the second component may be slid along the surface while maintaining a gap or without maintaining a gap between the first and second components. The dashed lines in FIG. 2A show the intended final position of flange 5 and the portion of the blade or rib portion 2a that will be deformed.

As shown in FIG. 2B, when the flanges 4, 5 are assembled, the blade or rib portion 2a is preferably asymmetrically deformed by the flange 5. The blade or rib portion 2a is preferably pushed off axis when the flange 5 is inserted. The blade or rib portion 2a preferably deforms into free space driven by the insertion of the flange 5. Advantageously, the seal can be made to be thinner in the plane perpendicular to the axis A due to this fact. The dashed lines in FIG. 2B show the original position of the blade or rib portion 2a.

The blade or rib portion 2a preferably remains in the off-axis position while the flanges 4, 5 remain assembled (and sealed). The flexible material of the blade or rib portion 2a preferably deforms in and back on itself when the flange 5 is removed.

Figure 3:
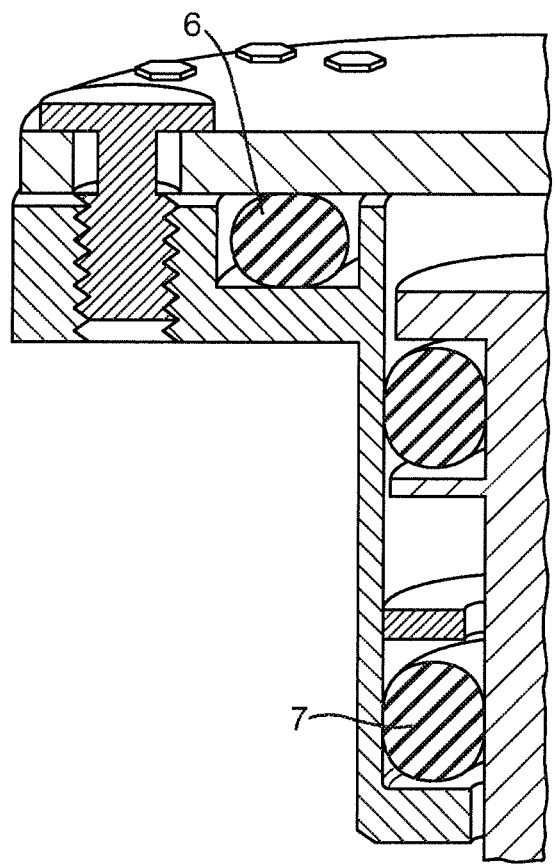
FIG. 3 shows a conventional sealing arrangement using multiple O-ring seals.

In contrast to the preferred embodiment a standard or conventional O-ring seal arrangement is shown in FIG. 3. In the conventional arrangement shown in FIG. 3 a flange style O-ring seal 6 is provided. The gland size is smaller than the O-ring cross section. Sealing load is provided by a mechanical load such as a screw or fixings.

Other O-ring seals 7 are provided which are compressed via the gland size (O-ring location region) having a smaller section size than the O-ring cross section.

Figure 4:
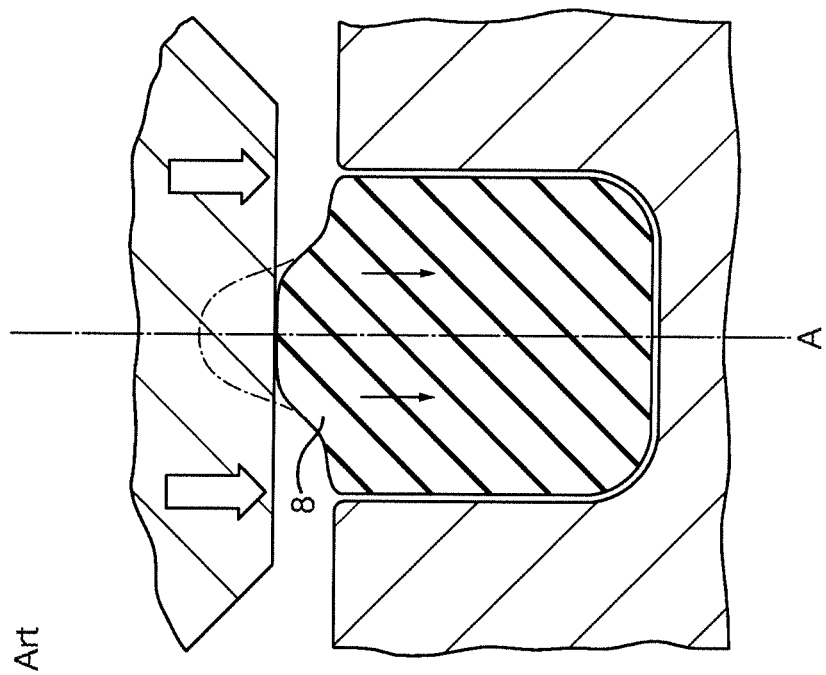
FIG. 4 shows another known sealing arrangement.
Figure 4:
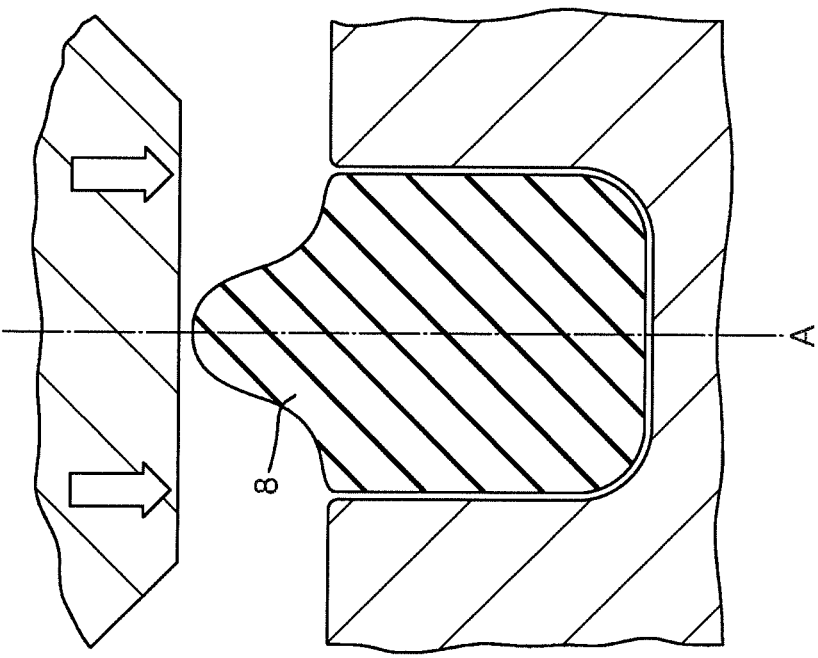

FIG. 4 illustrates how the seal of US US2010/0301207 is deformed when the ion source is closed. As the two parts are assembled, the seal 8 is symmetrically deformed about the axis A. The rubber seal is compressed and deformed into the groove in which it sits.

In a preferred embodiment, the form of the seal of the present invention is symmetrical, e.g. about the axis A. This ensures that it is difficult to install the seal in the incorrect orientation. However, in a less preferred embodiment, the seal 1 may be formed (i.e. moulded or manufactured) with an off-axis bias.

The blade or rib portion 2a of the seal 1 can be well controlled using moulding. The seal 1 is preferably formed so as to require minimal insertion force. The blade or rib portion is preferably arranged and adapted so that it will contour and deform around the circular surface of the flange 5 inserted over the seal. The seal 1 of the preferred embodiment can preferably form a seal with non-round or miss-aligned parts.

In a preferred embodiment, the blade or rib portion 2a substantially surrounds the main body portion 2 of the seal 1 (e.g. as shown in FIG. 1). However, in another embodiment, the main body portion 2 may substantially surround the blade or rib portion 2a. In this embodiment, the main body portion 2 of the seal 1 is preferably arranged and adapted to be located in a groove in the outer flange 5. The blade or rib portion 2a is preferably arranged and adapted to receive a component inserted into it.

The preferred seal 1 having a wiper blade profile 2a requires substantially less insertion/extraction force in order to locate the seal 1 into position compared with a conventional O-ring seal.

The preferred seal 1 has been specifically designed for use with components of a mass spectrometer (i.e. vacuum chamber housings) which need to be regularly disassembled, removed or otherwise serviced.

According to a preferred embodiment the preferred seal 1 may be provided in a region of a mass spectrometer which may require regular maintenance and/or cleaning. A particular advantage of the preferred seal 1 is that the preferred seal 1 can be easily removed and/or installed and is effectively self setting. For example, the preferred seal 1 does not require the user to tighten flanges to specific torques etc.

Further embodiments of the present invention are also contemplated wherein the profile of the preferred seal 1 may be slightly modified from the profile as shown in FIG. 1. For example, according to other embodiments the seal may comprise two or more blades or ribs 2a and/or the main body portion 2 may have a non-rectangular profile. For example, according to other embodiments the main body portion 2 may have a polygonal cross-sectional profile.

Although the present invention has been described with reference to preferred embodiments, it will be understood by those skilled in the art that various changes in form and detail may be made without departing from the scope of the invention as set forth in the accompanying claims.

The invention claimed is:

1. A mass spectrometer comprising:
   an ion block or a first vacuum chamber;
   a pumping block, a main housing of said mass spectrometer or a second vacuum chamber;
   one or more ion detectors; and
   a single annular vacuum chamber seal configured to seal the ion block or first vacuum chamber and the pumping block, main housing or second vacuum chamber, wherein the single annular vacuum chamber seal is located between the ion block or first vacuum chamber and the pumping block, main housing or second vacuum chamber;
   wherein the ion block or first vacuum chamber comprises a first component having a groove;
   wherein the annular vacuum chamber seal comprises a main body portion and one or more blade or rib portions which protrude from said main body portion, wherein said main body portion is located in said groove and wherein said one or more blade or rib portions protrude above or beyond a surface of said first component;
   wherein said one or more blade or rib portions protrude from said main body portion such that said one or more blade or rib portions substantially surrounds said main body portion and/or said groove;
   wherein the pumping block, main housing or second vacuum chamber comprises a second component which is configured to be slid, in use, along said surface of said first component so as to surround said surface of said first component and to thereby deform said one or more blade or rib portions so that said one or more blade or rib portions form a radial, diametric or piston seal between said first and second components; and
   wherein said annular vacuum chamber seal has a symmetrical form, wherein said one or more blade or rib portions is arranged and adapted to be asymmetrically deformed by said second component, and wherein said annular vacuum chamber seal is configured to return to its symmetrical form when the second component is removed.

2. A mass spectrometer as claimed in claim 1, wherein:
   said groove comprises an annular groove;
   said main body portion comprises an annular main body portion; and/or
   said one or more blade or rib portions comprises one or more annular blade or rib portions.

3. A mass spectrometer as claimed in claim 1, wherein said one or more blade or rib portions protrude from said main body portion such that said one or more blade or rib portions is substantially concentric and/or coaxial with said main body portion and/or said groove.

4. A mass spectrometer as claimed in claim 1, wherein said annular vacuum chamber seal is substantially arranged in a first plane, and wherein:
   said one or more blade or rib portions protrude from said main body portion in a direction parallel to said first plane; and/or
   said one or more blade or rib portions protrude above or beyond said surface of said first component in a direction parallel to said first plane.

5. A mass spectrometer as claimed in claim 1, wherein said surface of said first component comprises a first cylindrical surface.

6. A mass spectrometer as claimed claim 5, wherein said second component comprises a second cylindrical surface which is arranged and adapted to be slid along said first cylindrical surface of said first component and to thereby deform said one or more blade or rib portions so that said one or more blade or rib portions form a radial, diametric or piston seal between said first and second components.

7. A mass spectrometer as claimed in claim 6, wherein said second cylindrical surface is arranged and adapted to be substantially coaxial with said first cylindrical surface of said first component when said second component is slid along said surface of said first component.

8. A mass spectrometer as claimed in claim 1, wherein said annular vacuum chamber seal is symmetrical about a first plane, wherein said one or more blade or rib portions is arranged and adapted to be asymmetrically deformed in a direction perpendicular to said first plane by said second component, and wherein said annular vacuum chamber seal is configured to return to its symmetrical form when the second component is removed.

9. A mass spectrometer as claimed in claim 1, wherein said one or more blade or rib portions comprise a reduced thickness portion which facilitates compression of said one or more blade or rib portions; and
wherein said one or more blade or rib portions are arranged and adapted to deform, in use, and to be compressed towards and against said main body portion.

10. A mass spectrometer as claimed in claim 1, wherein said main body portion has a substantially square cross-sectional profile and wherein said one or more blade or rib portions has a substantially round cross-sectional profile.

11. A mass spectrometer as claimed in claim 1, wherein said one or more blade or rib portions are arranged and adapted to deform in use as said second component of said mass spectrometer is mounted upon or mated with said first component of a mass spectrometer.

12. A mass spectrometer as claimed in claim 1, wherein said first component comprises a first mating surface and said second component comprises a second mating surface, wherein said annular vacuum chamber seal is arranged and adapted to provide a gas tight seal and/or vacuum seal between said first mating surface and said second mating surface.

13. A mass spectrometer as claimed in claim 12, wherein said annular vacuum chamber seal is arranged and adapted to provide a gas tight seal and/or vacuum seal between said first mating surface and said second mating surface whilst under compression.

14. A mass spectrometer as claimed in claim 1, wherein said annular vacuum chamber seal is arranged and adapted to provide a vacuum seal between a vacuum chamber or a sub-atmospheric pressure region of said mass spectrometer and an atmospheric pressure region.

15. A mass spectrometer as claimed in claim 1, wherein said annular vacuum chamber seal is symmetrical about a first plane, wherein said main body portion has a substantially deep profile in a direction parallel to said first plane, and wherein said one or more blade or rib portions has a substantially shallow profile in the direction parallel to said first plane.

16. A method of assembling a mass spectrometer, the mass spectrometer comprising an ion block or a first vacuum chamber, a pumping block, a main housing or a second vacuum chamber and one or more ion detectors, wherein the ion block or first vacuum chamber comprises a first component having a groove, and wherein the pumping block, main housing or second vacuum chamber comprises a second component, the method comprising:
locating a single annular vacuum chamber seal comprising a main body portion and one or more blade or rib portions which protrude from said main body portion in said groove such that said one or more blade or rib portions protrude above or beyond a surface of said first component, wherein said one or more blade or rib portions protrude from said main body portion such that said one or more blade or rib portions substantially surrounds said main body portion and/or said groove; and
sliding the second component along said surface of said first component so that said second component surrounds said surface of said first component, thereby deforming said one or more blade or rib portions so that said one or more blade or rib portions form a radial, diametric or piston seal between said first and second components;
wherein said annular vacuum chamber seal has a symmetrical form, wherein said one or more blade or rib portions is arranged and adapted to be asymmetrically deformed by said second component, and wherein said annular vacuum chamber seal is configured to return to its symmetrical form when the second component is removed.

17. A mass spectrometer comprising:
an ion block or a first vacuum chamber;
a pumping block, a main housing of said mass spectrometer or a second vacuum chamber;
one or more ion detectors; and
a single annular vacuum chamber seal configured to seal the ion block or first vacuum chamber and the pumping block, main housing or second vacuum chamber, wherein the single annular vacuum chamber seal is located between the ion block or first vacuum chamber and the pumping block, main housing or second vacuum chamber;
wherein the pumping block, main housing or second vacuum chamber comprises a first component having a groove;
wherein the annular vacuum chamber seal comprises a main body portion and one or more blade or rib portions which protrude from said main body portion, wherein said main body portion is located in said groove and wherein said one or more blade or rib portions protrude above or beyond a surface of said first component;
wherein said one or more blade or rib portions protrude from said main body portion such that said one or more blade or rib portions substantially surrounds said main body portion and/or said groove;
wherein the ion block or first vacuum chamber comprises a second component which is configured to be slid, in use, along said surface of said first component so as to surround said surface of said first component and to thereby deform said one or more blade or rib portions so that said one or more blade or rib portions form a radial, diametric or piston seal between said first and second components; and
wherein said annular vacuum chamber seal has a symmetrical form, wherein said one or more blade or rib portions is arranged and adapted to be asymmetrically deformed by said second component, and wherein said annular vacuum chamber seal is configured to return to its symmetrical form when the second component is removed.

* * * * *